United States Patent [19]

Leger

[11] 4,327,166
[45] Apr. 27, 1982

[54] NONAQUEOUS CELL HAVING A MNO$_2$/POLY-CARBON FLUORIDE CATHODE

[75] Inventor: Violeta Z. Leger, North Olmsted, Ohio

[73] Assignee: Union Carbide Corporation, Danbury, Conn.

[21] Appl. No.: 191,997

[22] Filed: Sep. 29, 1980

[51] Int. Cl.$^3$ ............................................. H01M 6/14
[52] U.S. Cl. ..................................... 429/194; 429/224
[58] Field of Search ................................ 429/194, 224

[56] References Cited

U.S. PATENT DOCUMENTS 3,536,532 10/1970 Watanabe et al. .................. 429/194
3,700,502 10/1972 Watanabe et al. .................. 429/218
3,796,604 3/1974 Gabano et al. ...................... 429/197
3,852,113 12/1974 Yokota et al. ....................... 429/122
4,139,474 2/1979 Watanabe et al. ................... 428/414

FOREIGN PATENT DOCUMENTS 2734721 2/1979 Fed. Rep. of Germany .
51-92037 8/1976 Japan .
53-5734 1/1978 Japan .
54-86729 7/1979 Japan .

*Primary Examiner*—Charles F. Lefevour
*Attorney, Agent, or Firm*—Cornelius F. O'Brien

[57] ABSTRACT

A nonaqueous cell employing an anode such as lithium, a liquid organic electrolyte and a cathode comprising manganese dioxide and a poly-carbon fluoride such as $(C_2F)_n$ or $(CF_x)_n$ in which x is greater than 0 up to about 1.1.

8 Claims, 3 Drawing Figures

NONAQUEOUS CELL HAVING A MNO$_2$/POLY-CARBON FLUORIDE CATHODE

FIELD OF THE INVENTION

The invention relates to a nonaqueous cell utilizing an active metal anode, a liquid organic electrolyte and a cathode comprising manganese dioxide and a poly-carbon fluoride wherein said manganese dioxide contains less than 1 weight percent water based on the weight of the manganese dioxide and said poly-carbon fluoride has the general formula $(C_yF_x)_n$ wherein y is 1 or 2 and x is greater than 0 up to about 1.1.

BACKGROUND OF THE INVENTION

The development of high energy battery systems requires the compatability of an electrolyte possessing desirable electrochemical properties with highly reactive anode materials, such as lithium, sodium, and the like, and the efficient use of high energy density cathode materials, such as manganese dioxide. The use of aqueous electrolytes is precluded in these systems since the anode materials are sufficiently active to react with water chemically. It has, therefore, been necessary, in order to realize the high energy density obtainable through use of these highly reactive anodes and high energy density cathodes, to turn to the investigation of nonaqueous electrolyte systems and more particularly to nonaqueous organic electrolyte systems.

The term "nonaqueous organic electrolyte" in the prior art refers to an electrolyte which is composed of a solute, for example, a salt or complex salt of Group I-A, Group II-A or Group III-A elements of the Periodic Table, dissolved in an appropriate nonaqueous organic solvent. Conventional solvents include propylene carbonate, ethylene carbonate or γ-butyrolactone. The term "Periodic Table" as used herein refers to the Periodic Table of the Elements as set forth on the inside back cover of the Handbook of Chemistry and Physics, 48th Edition, the Chemical Rubber Co., Cleveland, Ohio, 1967–1968.

A multitude of solutes is known and recommended for use but the selection of a suitable solvent has been particularly troublesome since many of those solvents which are used to prepare electroyltes sufficiently conductive to permit effective ion migration through the solution are reactive with the highly active anodes mentioned above. Most investigators in this area, in search of suitable solvents, have concentrated on aliphatic and aromatic nitrogen- and oxygen-containing compounds with some attention given to organic sulfur-, phosphorus- and arsenic-containing compounds. The results of this search have not been entirely satisfactory since many of the solvents investigated still could not be used effectively with high energy density cathode materials, such as manganese dioxide (MnO$_2$), and were sufficiently corrosive to lithium anodes to prevent efficient performance over any length of time.

Although manganese dioxide has been mentioned as a possible cathode for cell applications, manganese dioxide inherently contains an unacceptable amount of water, both of the adsorbed and bound types, which is sufficient to cause anode (lithium) corrosion along with its associated hydrogen evolution. This type of corrosion that causes gas evolution is a serious problem in sealed cells, particularly in miniature type button cells. In order to maintain overall battery-powered electronic devices as compact as possible, the electronic devices are usually designed with cavities to accommodate the miniature cells as their power source. The cavities are usually made so that a cell can be snugly positioned therein thus making electronic contact with appropriate terminals within the device. A major potential problem in the use of cell-powered devices of this nature is that if the gas evolution causes the cell to bulge then the cell could become wedged within the cavity. This could result in damage to the device. Also, if electrolyte leaks from the cell it could cause damage to the device. Thus it is important that the physical dimensions of the cell's housing remain constant during discharge and that the cell with not leak any electrolyte into the device being powered.

U.S. Pat. No. 4,133,856 discloses a process for producing an MnO$_2$ electrode (cathode) for nonaqueous cells whereby the MnO$_2$ is initially heated within a range of 350° C. to 430° C. so as to substantially remove both the adsorbed and bound water and then, after being formed into an electrode with a conductive agent and binder, it is further heated in a range of 200° C. to 350° C. prior to its assembly into a cell. British Pat. No. 1,199,426 also discloses the heat treatment of MnO$_2$ in air at 250° C. to 450° C. to substantially remove its water component.

U.S. application Ser. No. 051,491 filed on June 25, 1979 discloses a nonaqueous cell employing among other components a 3-methyl-2-oxazolidone-based electrolyte and a manganese dioxide-containing cathode wherein the water content is less than 1 weight percent based on the weight of the manganese dioxide.

Fluorinated carbon cathodes are disclosed in U.S. Pat. Nos. 3,536,532 and 3,700,502 as having the formula $(CF_x)_n$ wherein x varies from 0.5 to about 1.0. The cathodes are stated as being extremely stable and resistive to chemicals over the range of x from 0 to about 1. U.S. Pat. No. 4,139,474 discloses $(C_2F)_n$ material.

It is an object of the present invention to provide a nonaqueous cell employing an MnO$_2$/$(C_yF_x)_n$ cathode for nonaqueous cell systems.

It is another object of the present invention to provide an MnO$_2$/$(C_yF_x)_n$ cathode for use with lithium anodes and various liquid organic electrolytes such as 3-methyl-2-oxazolidone in combination with at least one cosolvent and a solute.

It is another object of the present invention to provide a nonaqueous cell with an MnO$_2$ cathode having a layer of $(C_yF_x)_n$.

SUMMARY OF THE INVENTION

The invention provides a novel high energy density nonaqueous cell comprising an anode, an electrolyte and a cathode, said cathode comprising manganese dioxide having a water content of less than 1 weight percent based on the weight of the manganese dioxide; the improvement wherein a poly-carbon fluoride is added to the manganese dioxide cathode and has the formula $(C_yF_x)_n$ wherein y is 1 or 2, x is greater than 0 up to about 1.1 and n refers to the number of monomer units which can vary widely.

The poly-carbon fluoride is composed of carbon and fluorine in which the carbon includes graphitic and non-graphitic forms of carbon, such as coke, charcoal or active carbon. Preferably, the poly-carbon fluoride would be those having a y of 1 and an x between about 0.8 and 1.0, and poly-dicarbon monofluoride $(C_2F)_n$. The amount of the poly-carbon fluoride to be used with the manganese dioxide could be 50% by weight or less based on the weight of the manganese dioxide and poly-carbon fluoride. Preferably, the poly-carbon fluoride should be between about 10% by weight and about 30% by weight of the weight of the manganese dioxide and poly-carbon fluoride. This range of the poly-carbon fluoride would extend the ampere-hour capacity of the manganese dioxide to render the cells more acceptable for a wider range of applications. It has been observed that with the addition of the poly-carbon fluoride to a manganese dioxide-containing cathode, the voltage output remains substantially at the manganese dioxide level which is above the voltage output for a poly-carbon fluoride cathode such as $CF_x$ where x is about 0.85 to 1. It has also been observed that the addition of the poly-carbon fluoride will improve the pulse voltage maintenance at high drain rates beyond that obtainable with a manganese dioxide cathode.

The poly-carbon fluoride can be mixed with the manganese dioxide or could be added as a discrete layer disposed preferably adjacent the container interface of the cell.

The water inherently contained in both electrolytic and chemical types of manganese dioxide can be substantially removed by various treatments. For example, the manganese dioxide can be heated in air or an inert atmosphere at a temperature up to 380° C. for about 8 hours or at a lower temperature for a longer period of time. Care should be taken to avoid heating the manganese dioxide above its decomposition temperature which is about 400° C. in air. In oxygen atmospheres, higher temperatures may be employed. In accordance with this invention the manganese dioxide should be heated for a sufficient period of time to insure that the water content is reduced below about 1 weight percent, preferably below about 0.5 and most preferably below about 0.2 weight percent based on the weight of the manganese dioxide. An amount of water above about 1 weight percent would react with the highly active metal anode, such as lithium, and cause it to corrode thereby resulting in hydrogen evolution. As stated above, this could result in physical distortion and the cell and/or electrolyte leakage from the cell during storage or discharge.

To effectively remove the undesirable water from $MnO_2$, or $MnO_2$ mixed with a conductive agent and a suitable binder, to the level necessary to practice this invention, it is believed necessary that both the adsorbed and bound water be substantially removed. After the water removal treatment has been completed, it is essential that the manganese dioxide be shielded to prevent adsorption of water from the atmosphere. This could be accomplished by handling the treated manganese dioxide in a dry box or the like. Alternatively, the treated manganese dioxide or the manganese dioxide combined with a conductive agent and a suitable binder could be heat treated to remove water that could have been adsorbed from the atmosphere.

Preferably, the manganese dioxide should be heat treated to remove its water content to below about 1 weight percent and then it can be mixed with a conductive agent such as graphite, carbon or the like and a binder such as Teflon (trademark for polytetrafluoroethylene), ethylene acrylic acid polymer or the like to produce a solid cathode electrode. If desired, a small amount of the electrolyte can be incorporated into the manganese dioxide mix.

An added possible benefit in the removal of substantially all the water from manganese dioxide is that if small amounts of water are present in the cell's electrolyte, then the manganese dioxide will absorb the main portion of that water from the electrolyte and thereby prevent or substantially delay the reaction of the water with the anode such as lithium. In this situation, the manganese dioxide will act as an extracting agent for the water impurities in the organic solvents.

Highly active anodes for use in nonaqueous systems according to this invention would be consumable metals and include aluminum, the alkali metals, alkaline earth metals and alloys of alkali metals or alkaline earth metals with each other and other metals.

The term "alloys" as used herein and in the appended claims is intended to include mixtures, solid solutions, such as lithium-magnesium, and the intermetallic compounds, such as lithium monoaluminide. The preferred anode materials are lithium, sodium, potassium, calcium, magnesium and alloys thereof. Of the preferred anode materials, lithium would be the best because, in addition to being a ductile metal that can be easily assembled in a cell, it possesses the highest energy-to-weight ratio of the group of suitable anodes.

In nonaqueous cells, useful organic solvents employed alone or mixed with one or more other solvents for use in preparing electrolytes employed in the cell of this invention include the following classes of compounds:

Alkylene nitriles: e.g., crotonitrile
(liquid range −51.1° C. to 120° C.)
Trialkyl borates: e.g., trimethyl borate, $(CH_3O)_3B$
(liquid range −29.3° C. to 67° C.)
Tetraalkyl silicates: e.g., tetramethyl silicate, $(CH_3O)_4Si$
(boiling point 121° C.)
Nitroalkanes: e.g., nitromethane, $CH_3NO_2$ (liquid range −17° C. to 100.8° C.)
Alkylnitriles: e.g., acetonitrile, $CH_3CN$ (liquid range −45° C. to 81.6° C.)
Dialkylamides: e.g., dimethylformamide, $HCON(CH_3)_2$
(liquid range −60.48° C. to 149° C.)
Lactams: e.g., N-methylpyrrolidone,

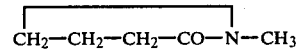

(liquid range −16° C. to 202° C.)
Monocarboxylic acid esters: e.g., ethyl acetate
(liquid range −83.6° to 77.06° C.)
Orthoesters: e.g., trimethylorthoformate, $HC(OCH_3)_3$
(boiling point 103° C.)
Lactones: e.g., γ-(gamma)butyrolactone,

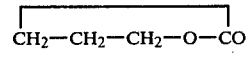

(liquid range −42° to 206° C.)
Dialkyl carbonates: e.g., dimethyl carbonate, $OC(OCH_3)_2$ (liquid range 2° to 90° C.)
Alkylene carbonates: e.g., propylene carbonate,

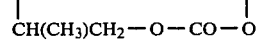

(liquid range −48° to 242° C.)
Monoethers: e.g., diethyl ether
 (liquid range −116° to 34.5° C.)
Polyethers: e.g., 1,1- and 1,2-dimethoxyethane
 (liquid ranges −113.2° to 64.5° C. and −58° to 83° C., respectively)
Cyclic ethers: e.g., tetrahydrofuran (liquid range −65° to 67° C.); 1,3-dioxolane (liquid range −95° to 78° C.)
Nitroaromatics: e.g., nitrobenzene
 (liquid range 5.7° to 210.8° C.)
Aromatic carboxylic acid halides: e.g., benzoyl chloride (liquid range 0° to 197° C.); benzoyl bromide (liquid range −24° to 218° C.)
Aromatic sulfonic acid halides: e.g., benzene sulfonyl chloride
 (liquid range 14.5° to 251° C.)
Aromatic phosphonic acid dihalides: e.g., benzene phosphonyl dichloride
 (boiling point 258° C.)
Aromatic thiophosphonic acid dihalides: e.g., benzene thiophosphonyl dichloride
 (boiling point 124° C. at 5 mm.)
Cyclic sulfones: e.g., sulfolane,

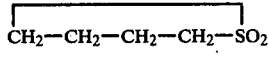

(melting point 22° C.); 3-methylsulfolane (melting point −1° C.)
Alkyl sulfonic acid halides: e.g., methanesulfonyl chloride
 (boiling point 161° C.)
Alkyl carboxylic acid halides: e.g., acetyl chloride (liquid range −112° to 50.9° C.); acetyl bromide (liquid range −96° to 76.° C.); propionyl chloride (liquid range −94° to 80° C.)
Saturated heterocyclics: e.g., tetrahydrothiophene (liquid range −96° to 121° C.); 3-methyl-2-oxazolidone (melting point 15.9° C.)
Dialkyl sulfamic acid halides: e.g., dimethyl sulfamyl chloride
 (boiling point 80° C. at 16 mm.)
Alkyl halosulfonates: e.g., ethyl chlorosulfonate
 (boiling point 151° C.)
Unsaturated heterocyclic carboxylic acid halides: e.g., 2-furoyl chloride
 (liquid range −2° to 173° C.)
Five-membered unsaturated heterocyclics: e.g., 3,5-dimethylisoxazole (boiling point 140° C.); 1-methylpyrrole (boiling point 114° C.); 2,4-dimethylthiazole (boiling point 144° C.); furan (liquid range −85.65° to 31.36° C.)
Esters and/or halides of dibasic carboxylic acids: e.g., ethyl oxalyl chloride
 (boiling point 135° C.)
Mixed alkyl sulfonic acid halides and carboxylic acid halides, e.g., chlorosulfonyl acetyl chloride
 (boiling point 98° C. at 10 mm)
Dialkyl sulfoxides: e.g., dimethyl sulfoxide
 (liquid range +18.4° to 189° C.)
Dialkyl sulfates: e.g., dimethylsulfate
 (liquid range −31.75° to 188.5° C.)
Dialkyl sulfites: e.g., dimethylsulfite
 (boiling point 126° C.)
Alkylene sulfites: e.g., ethylene glycol sulfite
 (liquid range −11° to 173° C.)
Halogenated alkanes: e.g., methylene chloride (liquid range −95° to 40° C.); 1,3-dichloropropane (liquid range −99.5° to 120.4° C.)

Of the above, the preferred solvents are sulfolane; crotonitrile; nitrobenzene; tetrahydrofuran; 1,3-dioxolane; 3-methyl-2-oxazolidone; propylene or ethylene carbonate; γ-butyrolactone; ethylene glycol sulfite; dimethylsulfite; dimethyl sulfoxide; and 1,1- and 1,2-dimethoxyethane. Of the preferred solvents, the best are 3-methyl-2-oxazolidone, propylene or ethylene carbonate, 1,2-dimethoxyethane, and 1,3-dioxolane because they appear more chemically inert to battery components and have wide liquid ranges, and especially because they permit highly efficient utilization of the cathode materials.

The ionizing solute for use in the invention may be a simple or double salt or mixtures thereof, e.g., (LiCF$_3$SO$_3$ or LiClO$_4$, which will produce an ionically conductive solution when dissolved in one or more solvents. Useful solutes include complexes of inorganic or organic Lewis acids and inorganic ionizable salts. The only requirements for utility are that the salts, whether simple or complex, be compatible with the solvent or solvents being employed and that they yield a solution which is sufficiently ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226, July/December 1938, pages 293-313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride and boron bromide.

Ionizable salts useful in combination with the Lewis acids include lithium flouride, lithium chloride, lithium bromide, lithium sulfide, sodium fluoride, sodium chloride, sodium bromide, potassium fluoride, potassium chloride and potassium bromide.

A separator for use in this invention has to be chemically inert and insoluble in the cell system and have a porosity so as to permit the liquid electrolyte to permeate through and contact the anode of the cell, thus establishing an ion transfer path between the anode and cathode.

The container housing for the cell can be made of stainless steel or some other conductive material that will not corrode or otherwise deteriorate when in contact with the cell materials.

The insulating member disposed between the cover and the can has to be stable in the presence of the cell components and can be selected from such materials as polytetrafluoroethylene (e.g., ("Teflon"), fluorinated ethylene-propylene (e.g., FEP), ethylene copolymer with FEP (e.g., "Tefzel"), chlorotrifluoroethylene (e.g., "Kel-F"), perfluoro-alkoxy polymer (e.g., PFA), tetrafluoroethylene (TFE), polyvinyl, polyethylene, polypropylene, polystyrene, nylon, etc.

EXAMPLE I

Figure 1:
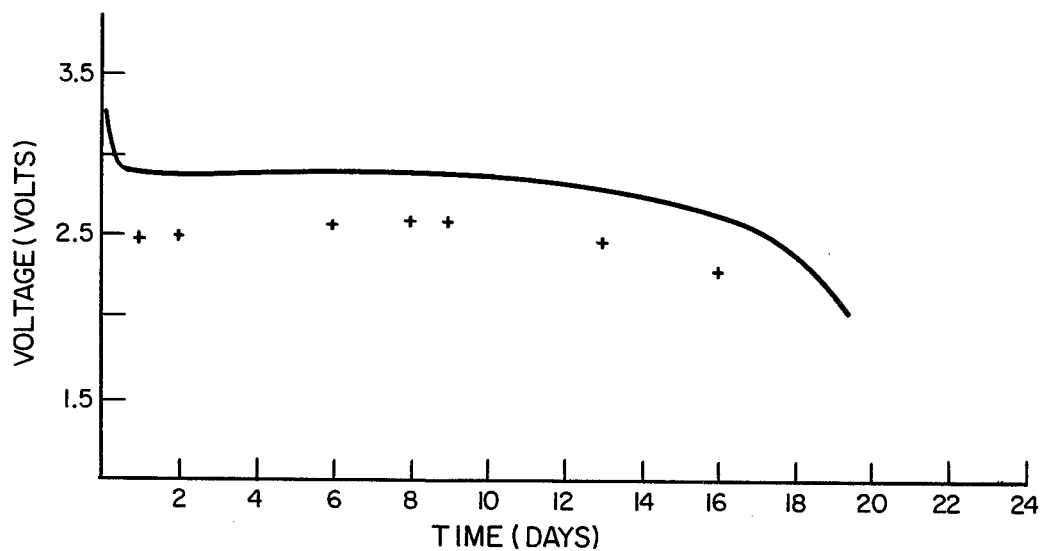
FIG. 1 is a graph of the ouput voltage and pulse voltage versus time for a nonaqueous cell employing a manganese dioxide cathode.

An experimental cell was constructed using a lithium anode (0.114 gram), a 1.5 cc electrolyte of 1 M $LiCF_3SO_3$ in 40 percent dioxolane, 30 percent dimethoxyethane and 30 percent 3-methyl-2-oxazolidone containing a trace of dimethylisoxazole and 0.3566 gram of a cathode containing 86% by weight $MnO_2$, 8.5% dry weight graphite, 2% by weight acetylene black and 3.5% polytetrafluoroethylene. The cell was discharged across a 15-K ohm load and the voltage observed with time is shown plotted in FIG. 1. At intervals the cell was discharged across a 1-K ohm load for two seconds and the pulse voltages observed are shown on the graph of FIG. 1 as cross (+) marks.

EXAMPLE II

Figure 2:
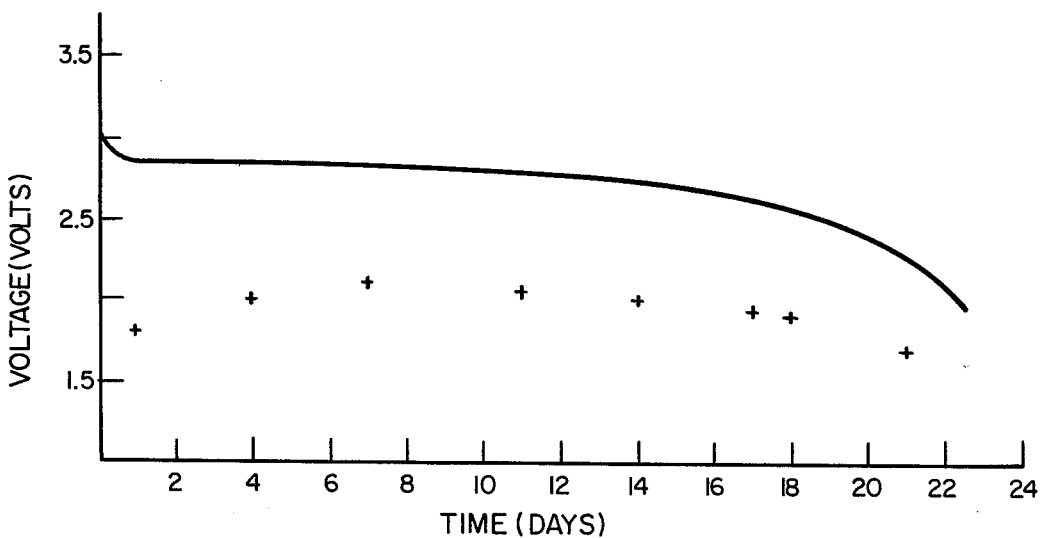
FIGS. 2 and 3 are graphs of the output voltage and pulse voltage versus time for nonaqueous cells employing a manganese dioxide-$CF_x$ cathode in accordance with this invention.

An experimental cell was constructed as in Example I except that the cathode was 0.358 gram of 77.4% by weight $MnO_2$, 8% by weight of $CF_x$ wherein x was 0.85 to 1, 9.1% acetylene black, and 5.5% polytetrafluoroethylene. The cell was discharged across a 15-K ohm load and the voltage observed with time is shown plotted in FIG. 2. At intervals the cell was discharged across a 300 ohm load for two seconds and the pulse voltages observed are shown on the graph of FIG. 2 as cross (+) marks.

EXAMPLE III

Figure 3:
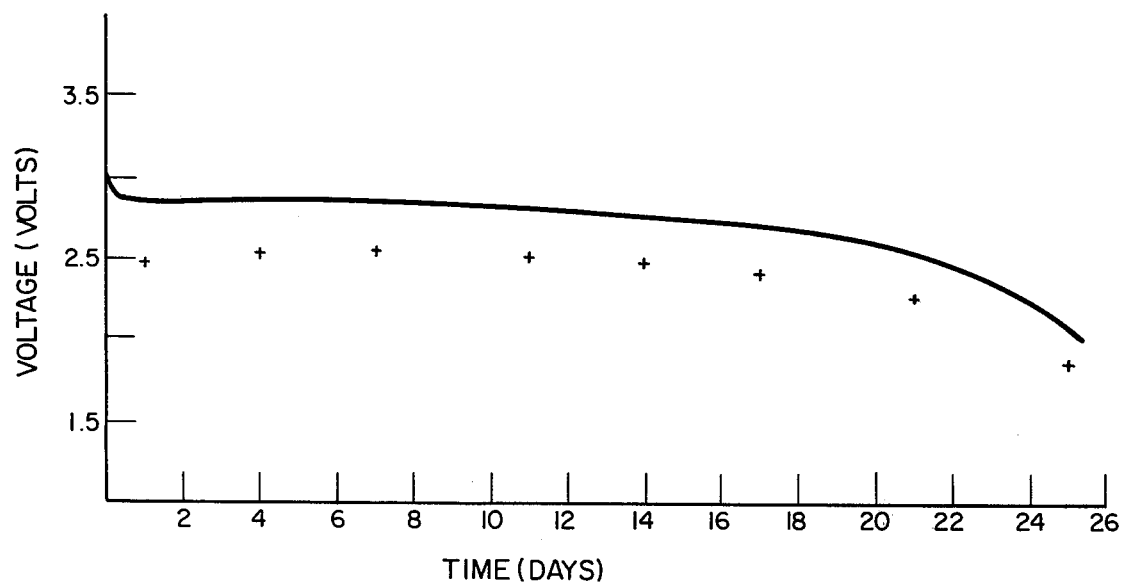

An experimental cell was constructed as in Example I except that the cathode was 0.362 gram of 69% by weight $MnO_2$, 16% by weight $CF_x$ wherein x was 0.85 to 1, 9% by weight acetylene black and 6% by weight polytetrafluoroethylene. The cell was discharged across a 15-K ohm load and the voltage observed with time is shown plotted in FIG. 2. At intervals the cell was discharged across a 1-K ohm load for two seconds and the pulse voltages observed are shown on the graph of FIG. 3 as cross (+) marks.

As evident from the data obtained from the above examples, the cells of this invention (Examples II and III) had a better ampere-hour capacity and pulse voltage maintenance at high drain rates than the cell employing an all-$MnO_2$ cathode (Example I).

It should be understood that the foregoing disclosure relates to preferred embodiments of the invention and it is intended to cover all changes and modifications of the invention which do not depart from the spirit and scope of the appended claims.

What is claimed is:

1. A nonaqueous cell comprising an anode selected from the group consisting of lithium, potassium, sodium, calcium, magnesium, aluminum and alloys thereof, an electrolyte of an ionizing solute dissolved in an organic solvent and a cathode, said cathode comprising manganese dioxide having a water content of less than 1 weight per cent based on the weight of the manganese dioxide; the improvement wherein a poly-carbon fluoride is added to the manganese dioxide cathode and has the formula $(C_yF_x)_n$ wherein y is 1 or 2 and x is greater than 0 up to about 1.1.

2. The nonaqueous cell of claim 1 wherein y is 1 and x is between about 0.8 and 1.0.

3. The nonaqueous cell of claim 1 wherein the poly-carbon fluoride is $(C_2F)_n$.

4. The nonaqueous cell of claim 1, 2 or 3 wherein the poly-carbon fluoride is present in an amount of 50% by weight or less based on the weight of the manganese dioxide.

5. The nonaqueous cell of claim 1, 2 or 3 wherein the poly-carbon fluoride is present in an amount of between about 10% by weight and 30% by weight based on the weight of the manganese dioxide.

6. The nonaqueous cell of claim 1, 2 or 3 wherein poly-carbon fluoride is mixed with the manganese dioxide.

7. The nonaqueous cell of claim 1, 2 or 3 wherein the poly-carbon fluoride is a layer disposed on the manganese dioxide.

8. The nonaqueous cell of claim 1, 2 or 3 wherein the cathode contains a binder and a conductive agent.

* * * * *